United States Patent Office 2,767,321
Patented Oct. 16, 1956

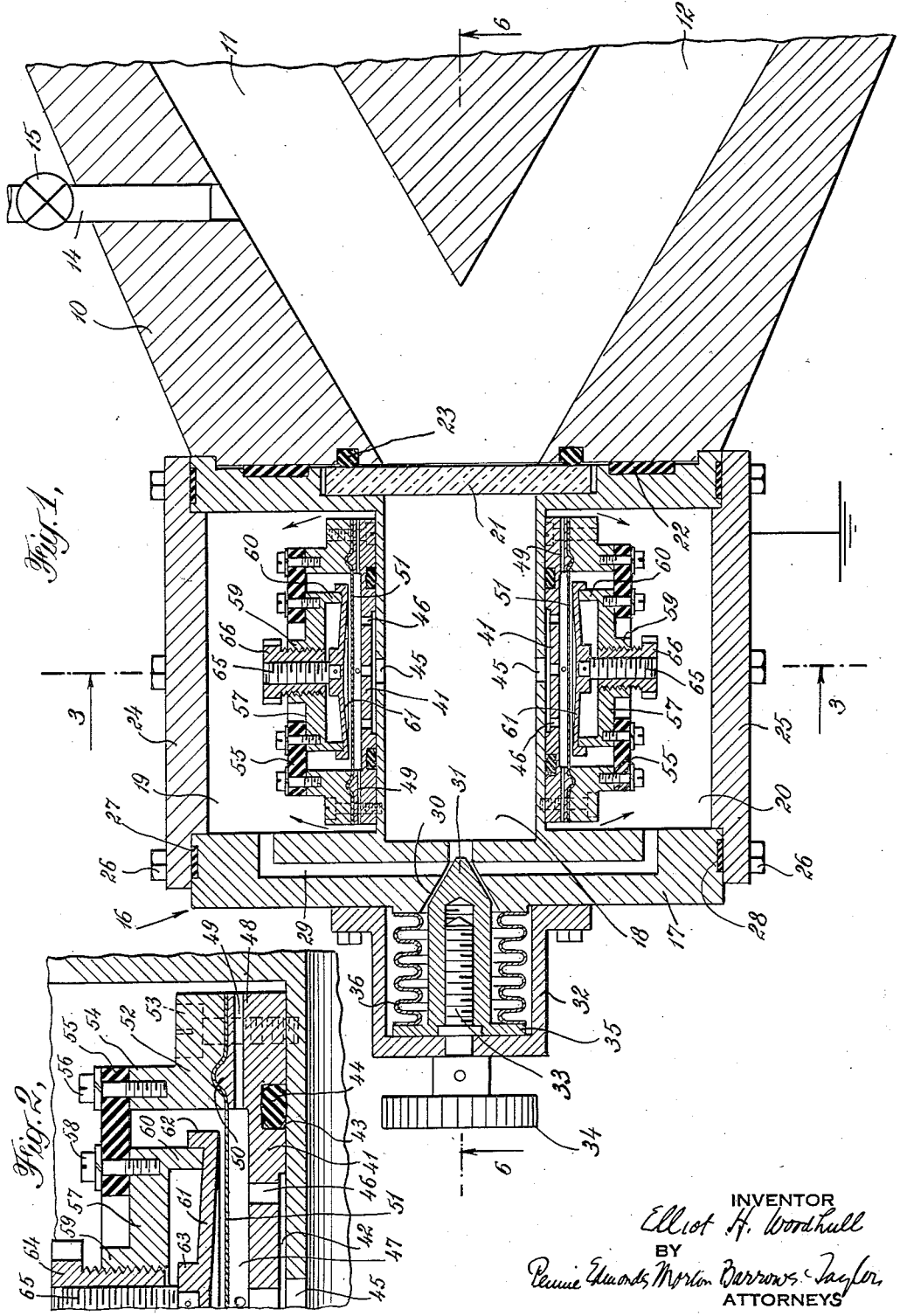

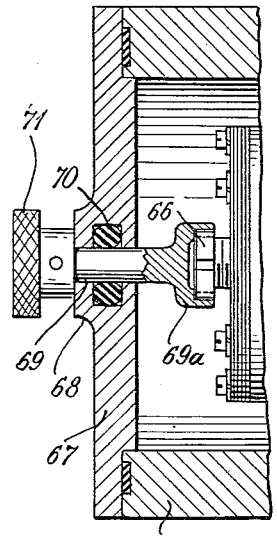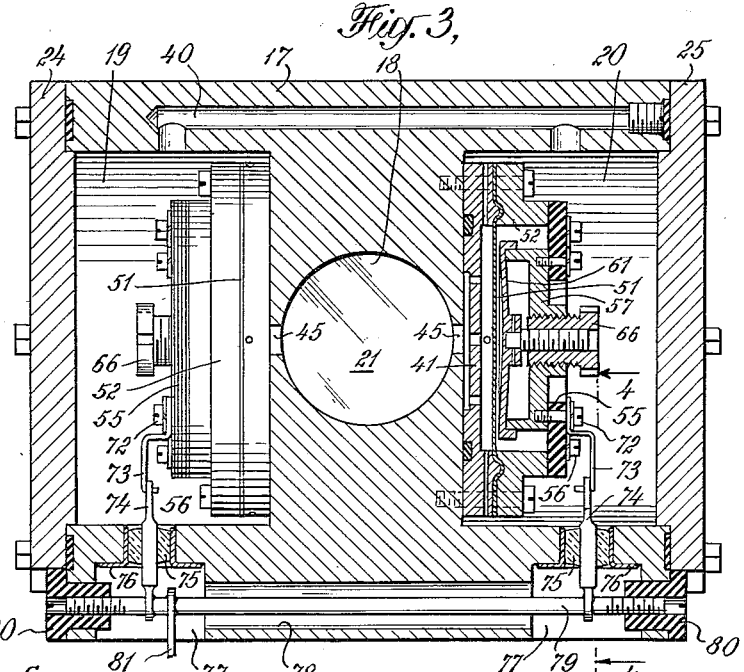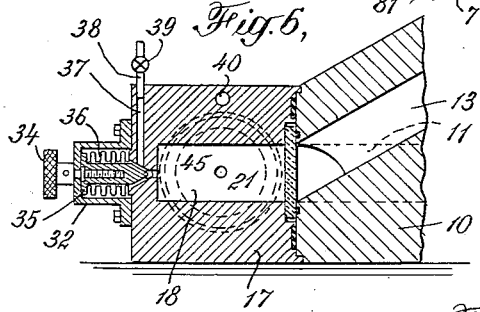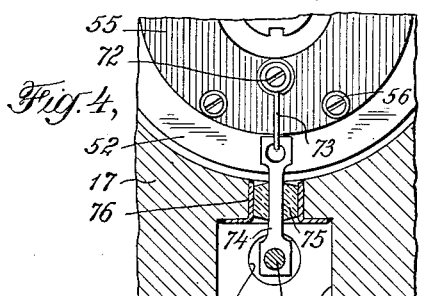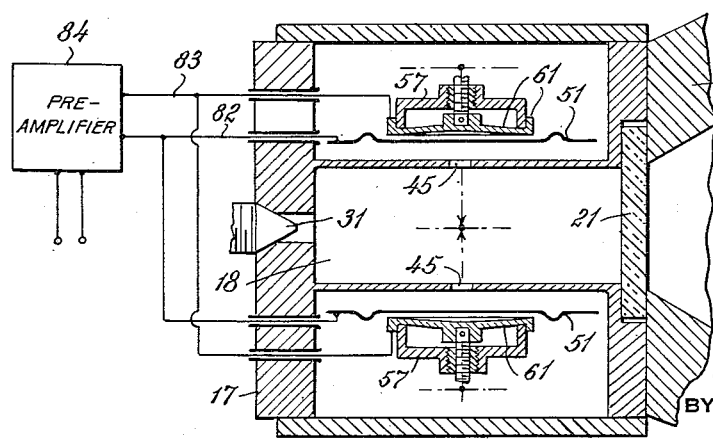

2,767,321

RADIATION DETECTORS

Elliot H. Woodhull, Norwalk, Conn., assignor to The Perkin-Elmer Corporation, Norwalk, Conn., a corporation of New York Application January 30, 1953, Serial No. 334,144

18 Claims. (Cl. 250—43.5)

This invention relates to detectors for radiant energy, and is concerned more particularly with a novel device for detecting and measuring infrared radiation. The new detector is of the type, in which the radiation falling upon the device is measured by the changes in capacity of an electrical condenser having a movable plate in the form of a membrane, which is deflected by a gas heated and expanded by the radiation. Detectors of the gas-operated condenser type are not new and are disclosed in prior patents, of which those to Hays 1,954,204, April 10, 1934, and Hall 2,115,578, April 26, 1938, are typical. The detector of the invention differs from and is superior to those of the patents mentioned in that it is not affected by translational accelerations and is thus not subject to errors arising therefrom. The desired results are obtained in the detector without loss of sensitivity or complicated structure and the detector is relatively simple to construct and adjust for operation.

The detector of the invention comprises a central chamber and a pair of outer chambers lying on opposite sides of the central chamber and separated therefrom by respective electrically conductive membranes. The membranes lie with their planes parallel, and within each outer chamber is a fixed plate lying in juxtaposition to the membrane and cooperating with the latter to form an electrical condenser. The three chambers all have a filling of the same gas or gas mixture at the same pressure and, in one form of the detector, the outer chambers are isolated from each other and the centers of gravity of the gas masses therein are equally spaced from the center of gravity of the gas mass in the central chamber and the three centers of gravity lie on a line normal to the planes of the membranes. In an alternative form, the detector is constructed with the outer chambers so connected that the combined gas masses therein act as one. In this form, the center of gravity of the combined gas masses is coincident with that of the gas mass in the central chamber. In both forms of the detector, translational accelerations tending to move the membranes relative to their fixed plates cause an increase in the capacity of one condenser, which is balanced by a decrease in capacity in the other. The condensers are connected in parallel and the accelerations, accordingly, produce no net capacity change in the circuit containing the condensers and no detector signal.

For a better understanding of the invention, reference may be made to the accompanying drawings, in which Fig. 1 is a horizontal sectional view through one form of the new detector;

Fig. 2 is a fragmentary sectional view on the same line as Fig. 1, but on an enlarged scale;

Fig. 3 is a sectional view on the line 3—3 of Fig. 1;

Fig. 4 is a sectional view on the line 4—4 of Fig. 3;

Fig. 5 is a fragmentary sectional view on the same line as Fig. 3 and showing the use of an adjusting device;

Fig. 6 is a sectional view on the line 6—6 of Fig. 1; and

Fig. 7 is a schematic view including a wiring diagram.

The detector of the invention is illustrated in the drawings in use in a non-dispersion analyzer of the type disclosed in the applications of Woodhull and Tisdale, Ser. No. 321,662, filed November 20, 1952, which matured as U. S. Patent No. 2,688,090, and Woodhull, Borden, and Montpas, Ser. No. 334,143, filed January 30, 1953, for both of which applications I am one of the co-applicants. The analyzer referred to comprises a housing 10 formed to provide passage 11, 12, and 13 for beams of radiation from a source, and the beams of radiation are chopped in such manner that radiation in two beams falls upon the detector at the same time and in alternation with radiation in the third beam. The passages in the housing may be used as a filter cell and the filter gas may be admitted into the passages in the housing through a connection 14 having a valve 15.

The detector comprises a housing generally designated 16 and preferably made of a block of metal 17, which is formed with a central chamber 18 and outer chambers 19, 20 on opposite sides thereof. The chambers may be formed by drilling, in which event they are of circular cross section, as shown. The chamber 18 has an open end aligned with the ends of the passages in housing 10 and closed by a window 21 of infrared transmitting material, such as a suitable crystal.

The housing 16 is secured to housing 10 in any suitable way, as by screws passing through openings in block 17 and into the end of housing 10. The end wall of block 17 opposed to the outer face of housing 10 is formed with a channel encircling the window and containing a gasket 22 of a suitable packing material. The end wall of housing 10 is also provided with a channel encircling the opening in the housing leading to window 21 and a packing 23 in the form of an O-ring is mounted in the channel in position to engage the outer face of the window. The packing material used for the gasket and ring and elsewhere in the detector may be the tetrafluoroethylene polymer sold commercially under the name "Teflon."

The outer ends of chambers 19 and 20 are closed by plates 24, 25, which are held in place by screws 26 passing through the plates and threaded into block 17. Gaskets 27, 28 of suitable packing material are seated in channels in the ends of the block in position to be engaged by plates 24, 25 and serve to prevent leakage from the chambers.

The chambers 18, 19, and 20 are connected by a passage 29 in the outer wall of block 17 and the passage is provided with a conical seat 30 opening through the outer face of block 17 and engageable by the plug 31 of a valve. The plug lies mainly within a housing 32 secured to the outer face of block 17 and is movable toward and away from its seat by an adjustment screw 33 extending through an opening in the outer wall of housing 32 and provided at its exposed end with a disc 34, by which the screw may be turned. In order to prevent leakage between passage 29 and the atmosphere, when plug 31 is unseated, the outer end of the plug is provided with a flange 35, to which is secured one end of a metal bellows 36, the other end of the bellows being secured to the wall of block 17 around the conical seat 30. The outer wall of block 17 is provided with a passage 37 (Fig. 6) leading to the interior of the valve seat 30, and the passage is provided with a connection 38 containing a valve 39. By rotation of the screw 33, the plug may be backed out, so that the three chambers 18, 19, and 20 are connected by passage 29 and can be evacuated through connection 38. Thereafter, in preparing the detector for use, the chambers are filled with a gas or gas mixture to the desired pressure and the chambers are then shut off from one another by seating the plug 31. For some purposes, it may be desirable to provide a connection between the chambers 19, 20 in the form of an open passage 40 (Fig. 6), which is of such cross-sectional area that the gas masses in the two chambers act as a single mass. Instead of a single passage, the connection between the chambers may be made by two open passages similar to passage 40 with the passages connecting the chambers at opposite sides of their axes. Thus, one passage may connect the chambers at their tops and the other at their bottoms.

Each of the chambers 19, 20 contains a variable condenser, the capacity of which varies with changes in pressure within the central chamber 18 and, as the two condensers are alike, only that in chamber 19 need be described. Such a condenser comprises a plate 41 (Figs. 1, 2) mounted on the inner wall of chamber 19 and provided with a central cavity 42 facing that wall, the cavity being encircled by a channel 43 containing an O-ring gasket 44 engaging the wall. The cavity 42 is connected to the central chamber 18 through one or more openings 45 through the inner wall of chamber 19, and a number of openings 46 extend through plate 41 from cavity 42. The outer face of plate 41 is provided with a central cavity 47 lying within an encircling flange 48 and the flange may be provided with one or more equalizing ducts 49 of capillary size, which lead from the cavity 47 to the interior of chamber 19 at the periphery of plate 41.

The flange 48 is provided with a circumferential rib 50 on its outer face and the peripheral margin of a thin flexible metallic diaphragm 51 overlies the outer face of the flange and is clamped against that face by a flat ring 52 having a face of the same dimensions as flange 48 and provided with a circumferential channel, into which the diaphragm is forced by rib 50. The plate 41 and ring 52 are secured in position by screws 53 passing through the ring, the membrance, and the plate and entering the block 17. The clamping of the margin of the diaphragm between flange 48 and ring 52, as described, causes the diaphragm to be tensioned.

The ring 52 has an axial flange 54, upon the outer end of which a flat ring 55 of insulating material is secured by screws 56 passing through the ring and into the flange. A cup-shaped metallic abutment member 57 is secured on the inner face of ring 55 by screws 58, and the member is provided with a central boss 59 extending from its outer face and internally threaded, and with a cylindrical flange 60 lying concentric with the boss 59 and extending from the inner face of the member. A circular plate 61 rests on the inner face of the flange 60 and the plate has a peripheral flange 62 overlapping flange 60 and a central boss 63 aligned with boss 59. An outer adjustment screw 64 with an internally threaded bore through it is screwed into boss 59 and an inner adjustment screw 65 is screwed into the bore through screw 64 and has its end secured in a socket in boss 63 on plate 61. Screw 64 has a non-circular head 66 and the internal and external threads on the two screws are of different pitch.

The membrane 51 forms the movable plate of a condenser, of which plate 61 forms the fixed plate, and the initial capacity of the condenser is adjustable by rotating screw 64. As the screw is thus moved in one direction or another, the central part of plate 61 within flange 60 on plate 57 is moved toward and away from the membrane, while its margin is held in fixed position by engagement with flange 60. Under normal conditions, plate 61 is distorted by having its central portion bulged outwardly to a greater or less extent, and this causes a force to be exerted on the threads of screws 64 and 65 tending to lock the screws in adjusted position. The use of the two sets of threads on screw 64 provides a vernier adjustment, so that the position of the central part of plate 61 relative to the membrane can be adjusted within very small limits.

In the use of the new detector in the instruments of the co-pending applications, above identified, for the determination of the amount of a gas of interest present in a sample to be examined, the chambers 18, 19, and 20 are evacuated through the connection 38 and are then filled with the gas of the interest at the desired pressure giving maximum detector sensitivity. As is well known in the art, the detector chambers may be filled with a gas mixture in which the gas of interest is diluted with an inert gas to produce optimum response. The valve 39 is then closed and the plug 31 is moved inward to cut off the chambers from one another. As long period thermal changes occur, the gas pressures in all the chambers continue in balance, since the outer chambers 19 and 20 are connected to the central chamber 18 through the capillaries 49 and the openings 45 and 46. Thereafter, the capacities of the condensers are balanced by adjustment of the capacity of one condenser by varying the spacing between its forced plate 61 and its membrane 51.

The adjustment of the capacity of either or both condensers should be made while the chambers 18, 19, and 20 are filled with the gas of interest at the pressure to be used in the operation of the instrument. Accordingly, for the purpose of making the adjustment, the plates 24, 25, which close the chambers 19 and 20 are removed and replaced by plates 67. Each plate 67 is provided with a central boss 68 having an opening for the stem of an end wrench 69, the opening being formed with an internal circumferential channel containing an O-ring 70 of packing material. The wrench has a socket which fits over the head 66 on screw 59, and the outer end of the stem is provided with a knurled head 71, by which the stem may be rotated to turn screw 66. In adjusting the capacity of the condensers after the wrench plates 67 have been mounted in position, the three chambers 18, 19, and 20 are filled with the gas at the proper pressure and plug 31 is seated. Thereafter, the detector is placed upon a shake table, which subjects it to repeated translational acceleration. While the detector is being shaken, any further adjustment of the fixed plate of one of the condensers necessary to equalize the capacities of the condensers is made. If the detector is of the type, in which the outer chambers 19, 20 are cut off from one another, the adjustment in condenser capacity above described, nullifies the effect of differences in pressure of the gas masses on opposite sides of the two membranes and differences in the deflection of the two membranes resulting from differences in their thickness and tension. If the detector is of the type, in which the chambers 19, 20 are connected by one or more connections 40, so that the gas masses in the two chambers act as one, the adjustment in condenser capacity nullifies the effect of differences in the deflection of the membranes resulting from differences in their thickness and tension.

The membranes 51 of the two condensers in chambers 19, 20 are grounded through the wall of housing 16 and the fixed plate 61 of each condenser is connected through its abutment member 57 to screws 72, which secure the abutment member to the insulating ring 55. A lead 73 is connected to one of the screws 72 and also to a terminal connection 74 sealed through a body of glass 75 mounted in a sleeve 76, which is secured within an opening through the wall of block 17 leading to the chamber containing the condenser. The bottom of the block 17 has chambers 77, into which the terminals 74 extend, and the chambers are connected by a passage 78. A metal rod 79 is mounted in insulating bushings 80 in openings leading to chambers 77 and the rod extends through the chambers and passage 78 and is connected to the outer ends of terminals 74. A lead 81 is attached to the rod and may extend to a preamplifier, in which capacity changes in the condensers are converted into voltage changes, as disclosed in the co-pending application of Woodhull and Tisdale, above identified.

The electrical connection for the condensers are diagrammatically illustrated in Fig. 7. As there shown, the two membranes 51 are, in effect, connected to a line 82 and the two fixed plates 61 of the condensers are connected to a line 83. The two condensers are thus connected in parallel and lines 82, 83 may lead to the preamplifier 84, mentioned above.

I claim:

1. In a radiation detector, a gas-tight housing, a pair of electrical condensers within the housing, each condenser including a flexible membrane and a plate, the membranes lying with their planes parallel and subdividing the housing into a pair of outer chambers containing respective plates and a central chamber between the membranes, the three chambers containing a filling of the same gas at the same pressure, a window in the wall of the housing and partly defining the central chamber, the window admitting radiation directly into the central chamber, and a circuit, in which the condensers are so connected that the combined capacity of the condensers varies in response to changes in gas pressure within the central chamber but remains unchanged as the membranes move in unison in response to translational accelerations acting on the housing.

2. In a radiation detector, a housing containing a pair of outer chambers and a central chamber between them, a pair of electrically conductive membranes separating respective outer chambers from the central chamber and lying with their planes parallel, the chambers all having a filling of the same gas at the same pressure and the centers of gravity of the gas masses in the three chambers lying on a line normal to the planes of the membranes with the center of gravity of the gas mass in the central chamber equidistant from the centers of gravity of the gas masses in the outer chambers, a plate mounted in opposition to each membrane and forming an electrical condenser therewith, a window in the wall of the housing and partly defining the central chamber, the window admitting radiation directly into the central chamber, an electrical connection between the membranes, and an electrical connection between the plates.

3. In a radiation detector, a housing containing a pair of outer chambers and a central chamber between them, a pair of electrically conductive membranes separating respective outer chambers from the central chamber and lying with their planes parallel, the chambers all having a filling of the same gas at the same pressure and the centers of gravity of the gas masses in the three chambers lying on a line normal to the planes of the membranes with the center of gravity of the gas mass in the central chamber equidistant from the centers of gravity of the gas masses in the outer chambers, a plate in each outer chamber mounted in opposition to the adjacent membrane and forming an electrical condenser therewith, a window in the wall of the housing and partly defining the central chamber, the window admitting radiation directly into the central chamber, an electrical connection between the membranes, and an electrical connection between the plates.

4. In a radiation detector, a housing containing a pair of outer chambers and a central chamber between them, a pair of electrically conductive membranes separating respective outer chambers from the central chamber and lying with their planes parallel, the chambers all having a filling of the same gas at the same pressure and the centers of gravity of the gas masses in the three chambers lying on a line normal to the planes of the membranes with the center of gravity of the gas mass in the central chamber equidistant from the centers of gravity of the gas masses in the outer chambers, a plate mounted in opposition to each membrane and forming an electrical condenser therewith, a window for admitting radiation directly into the central chamber and lying normal to the planes of the membranes, an electrical connection between the membranes, and an electrical connection between the plates.

5. In a radiation detector, a housing containing a pair of outer chambers and a central chamber between them, a pair of electrically conductive membranes separating respective outer chambers from the central chamber and lying with their planes parallel, the chambers all having a filling of the same gas at the same pressure, a plate in each outer chamber mounted in opposition to the adjacent membrane and forming an electrical condenser therewith, a window in the wall of the housing and partly defining the central chamber, the window admitting radiation directly into the central chamber, equalizing ducts connecting the central chamber to the outer chambers and maintaining equal gas temperatures and pressures in the chambers through long period thermal changes, an electrical connection between the plates, and an electrical connection between the membranes.

6. In a radiation detector, a housing containing a pair of outer chambers and a central chamber between them, a pair of electrically conductive membranes separating respective outer chambers from the central chamber and lying with their planes parallel, the chambers all having a filling of the same gas at the same pressure, a plate in each outer chamber mounted in opposition to the adjacent membrane and forming an electrical condenser therewith, a window in the wall of the housing and partly defining the central chamber, the window admitting radiation directly into the central chamber, an electrical connection between the plates, an electrical connection between the membranes, a passage connected to the three chambers, and a valve for closing the passage and shutting off the chambers from one another.

7. In a radiation detector, a gas-tight housing, a pair of electrical condensers within the housing, each condenser including a flexible membrane and a plate, the membranes lying with their planes parallel and subdividing the housing into a pair of outer chambers containing respective plates and a central chamber between the membranes, the three chambers containing a filling of the same gas at the same pressure, means for varying the spacing of each plate from its associated membrane, a window for admitting radiation directly into the central chamber, and a circuit, in which the condensers are so connected that the combined capacity of the condensers varies in response to changes in gas pressure within the central chamber but remains unchanged as the membranes move in unison in response to translational accelerations acting on the housing.

8. In a radiation detector, a housing containing a pair of outer chambers and a central chamber between them, a pair of electrically conductive membranes separating respective outer chambers from the central chamber and lying with their planes parallel, the chambers all having a filling of the same gas at the same pressure, a plate in each outer chamber mounted in opposition to the adjacent membrane and forming an electrical condenser therewith, an abutment engaging the outer face of each plate adjacent its periphery, means on the abutment engaging the central portion of each plate and operable to vary the spacing between said central portion and its associated membrane, a window for admitting radiation directly into the central chamber, an electrical connection between the plates, and an electrical connection between the membranes.

9. In a radiation detector, a housing having a central partition subdividing the housing into a pair of outer chambers and containing a central chamber having openings leading to the respective outer chambers, a flexible conductive membrane mounted in each outer chamber opposite the opening in the adjacent partition, a plate mounted in opposition to the membrane and forming an electrical condenser with the membrane, a window mounted on the central partition for admitting radiation directly into the central chamber, an electrical connection between the membranes, and an electrical connection between the plates.

10. In a radiation detector, a support formed of a pair of members secured together and defining a space between them, an annular abutment attached to one of the members and lying within the space, a metal plate mounted on the abutment within the space, the abutment engaging the plate near its periphery, a flexible conductive membrane having its margin clamped between the members and lying on the side of the plate remote from the abutment, the membrane and plate forming an electrical condenser, and cooperating means on the abutment and plate for varying the spacing between the portion of the plate within the abutment and the membrane.

11. In a radiation detector, a flexible electrically conductive membrane, means for clamping a zone of the membrane, a conductive plate lying face to face with and spaced from the membrane, an abutment engaging a zone of the outer face of the plate, and means for flexing the area of the plate inward from the abutment to vary the spacing between said area and the membrane.

12. In a radiation detector, a flexible electrically conductive membrane, means for clamping a zone of the membrane, a metal plate lying face to face with and spaced from the membrane, an abutment engaging a zone of the outer face of the plate, and means extending through the abutment and secured to the plate, said means being operable to flex the area of the plate inward from the abutment to vary the spacing between said area and the membrane.

13. In a radiation detector, a housing, a pair of spaced flexible electrically conductive membranes mounted in the housing with their planes parallel and subdividing the interior of the housing into a pair of outer chambers and a central chamber between them, a connection between the outer chambers, the chambers all having a filling of the same gas at the same pressure and the center of gravity of the combined gas masses in the two outer chambers coinciding with the center of gravity of the gas mass in the central chamber, a plate within each outer chamber cooperating with the adjacent membrane to form an electrical condenser, and a window in the wall of the housing and partly defining the central chamber, the window admitting radiation directly into the central chamber.

14. In a radiation detector, a housing, a pair of spaced flexible electrically conductive membranes mounted in the housing with their planes parallel and subdividing the interior of the housing into a pair of outer chambers and a central chamber between them, a connection between the outer chambers, the chambers all having a filling of the same gas at the same pressure and the center of gravity of the combined gas masses in the two outer chambers coinciding with the center of gravity of the gas mass in the central chamber, a pair of conductive plates lying face to face with respective membranes and cooperating with the membranes to form electrical condensers, means for connecting the membranes together, means for connecting the plates together, and a window in the wall of the housing and partly defining the central chamber, the window admitting radiation directly into the central chamber.

15. In a radiation detector, a housing, a pair of spaced flexible electrically conductive membranes mounted in the housing with their planes parallel and subdividing the interior of the housing into a pair of outer chambers and a central chamber between them, means for connecting the outer chambers, said means including continuously open passages connected to respective chambers on opposite sides of the axes thereof, the chambers all having a filling of the same gas at the same pressure and the center of gravity of the combined gas masses in the two outer chambers coinciding with the center of gravity of the gas mass in the central chamber, a plate within each outer chamber cooperating with the adjacent membrane to form an electrical condenser, and a window in the wall of the housing and partly defining the central chamber, the window admitting radiation directly into the central chamber.

16. A radiation detector in accordance with claim 11 wherein said means for flexing an area of said plate comprises coarse and fine degrees of adjustment.

17. A radiation detector in accordance with claim 11 wherein said means for flexing an area of said plate comprises co-axial screws of different pitch arranged to adjustably displace said area.

18. A radiation detector in accordance with claim 11 wherein the area of said plate which is flexed inward is substantially less than the whole of said conductive plate.

References Cited in the file of this patent

UNITED STATES PATENTS

| | | |
|---|---|---|
| 2,424,976 | Golay et al. | Aug. 5, 1947 |
| 2,648,775 | Waters | Aug. 11, 1953 |
| 2,681,415 | Liston | June 15, 1954 |